(12) United States Patent
Zaikonnikov

(10) Patent No.: US 11,193,629 B2
(45) Date of Patent: Dec. 7, 2021

(54) BRACKET ASSEMBLY

(71) Applicant: Norphonic AS, Bønes (NO)

(72) Inventor: Eugene Zaikonnikov, Bønes (NO)

(73) Assignee: Norphonic AS, Bønes (NO)

( * ) Notice: Subject to any disclaimer, the term of this patent is extended or adjusted under 35 U.S.C. 154(b) by 0 days.

(21) Appl. No.: 16/881,471

(22) Filed: May 22, 2020

(65) Prior Publication Data

US 2020/0393080 A1 Dec. 17, 2020

(30) Foreign Application Priority Data

May 24, 2019 (NO) .................................. 20190664

(51) Int. Cl.
*H04M 1/06* (2006.01)
*F16M 13/02* (2006.01)

(52) U.S. Cl.
CPC ......... *F16M 13/02* (2013.01); *F16M 2200/02* (2013.01); *H04M 1/06* (2013.01)

(58) Field of Classification Search
CPC ... F16M 2200/02; H02G 3/20; H04M 1/0297; H05K 5/0208
USPC .................................................... 248/222.13
See application file for complete search history.

(56) References Cited

U.S. PATENT DOCUMENTS

| | | | | |
|---|---|---|---|---|
| 2,966,107 A * | 12/1960 | Sanderson | ........... | F16M 11/041 248/187.1 |
| 4,588,866 A * | 5/1986 | Monti | ........... | H04M 1/0297 379/435 |
| 4,648,737 A * | 3/1987 | Lake, Jr. | ........... | E05B 73/00 206/821 |
| 4,930,694 A * | 6/1990 | Yoshitake | ........... | B60P 7/13 224/547 |
| 6,186,826 B1 * | 2/2001 | Weikle | ........... | H01R 24/64 439/536 |
| 6,904,149 B2 * | 6/2005 | Keenum | ........... | H04M 1/0293 379/438 |
| 7,922,139 B2 * | 4/2011 | Dittmer | ........... | F16M 11/10 248/325 |
| 8,025,528 B2 * | 9/2011 | Smith | ........... | F16M 11/041 439/537 |
| 8,205,847 B2 * | 6/2012 | Dorris | ........... | F16M 11/041 248/317 |
| 8,485,482 B2 * | 7/2013 | Patalak | ........... | F16M 11/041 248/229.11 |

(Continued)

FOREIGN PATENT DOCUMENTS

GB 2563579 A 12/2018

OTHER PUBLICATIONS

Norwegian Search Report for Application No. 20190664, dated Dec. 21, 2019 in 2 pages.

*Primary Examiner* — Bradley Duckworth
(74) *Attorney, Agent, or Firm* — Knobbe, Martens, Olson & Bear, LLP

(57) ABSTRACT

A bracket assembly includes a first body and a second body. The first body includes one or more first retainers and the second body includes one or more second retainers. The retainers are shaped and arranged for mating engagement by relative movement of one or both of the first and second body. Interaction between the retainers causes the first and second bodies to become interlocked and forced towards one another. The first retainers can include first and second lug pairs and the second retainers can include first and second wedge portions.

13 Claims, 4 Drawing Sheets

(56) References Cited

U.S. PATENT DOCUMENTS

| | | | |
|---|---|---|---|
| 8,733,603 B2* | 5/2014 | Tages | F16M 11/041 |
| | | | 224/271 |
| 9,300,122 B2* | 3/2016 | MacIntosh | H02G 3/20 |
| 10,330,240 B1* | 6/2019 | Cho | F16M 11/041 |
| 2005/0045784 A1* | 3/2005 | Pitlor | H02G 3/20 |
| | | | 248/206.5 |
| 2007/0018067 A1* | 1/2007 | Huang | H05K 5/0204 |
| | | | 248/346.03 |
| 2009/0108157 A1* | 4/2009 | Spencer | A47K 10/10 |
| | | | 248/222.13 |

* cited by examiner

BRACKET ASSEMBLY

CROSS-REFERENCE TO RELATED APPLICATION

This application claims priority to Norwegian Patent Application No. 20190664 filed on May 24, 2019, the disclosure of which including the specification, the drawings, and the claims is hereby incorporated by reference in its entirety.

FIELD OF THE INVENTION

The invention concerns a bracket assembly, particularly for installation in an opening in a cabinet wall, or similar. The bracket assembly may for example be used as a support device for an electronic device, such as a telephone.

BACKGROUND OF THE INVENTION

Fixed installations of various electronic devices are common in a wide range of industries and the society in general. For example, outdoor emergency telephones are placed in public places, in industrial sites, along roadways and in tunnels. Such telephones are designed to withstand high levels of air humidity, dust, vibration, extreme temperatures, rain, seawater and attempted vandalism, and are typically installed on the wall or door of a larger cabinet. Examples are emergency roadside telephones which are installed on "SOS Call Boxes" along public highways, and communication units installed on cabinets on ships or in industrial complexes.

In such applications, the electronic device is typically installed with the majority of the hardware (circuit boards, processors, power supply, etc.) inside the cabinet, i.e. behind a wall or door, while the user-interface (telephone handset, keypad, etc.) is arranged on the outside. The electronic device therefore typically comprises at least two units, which must be physically interconnected through an opening in the cabinet wall or door. The installation and removal of such electronic device is therefore often a complicated and time-consuming procedure, involving a manual operation of several screws or bolts. It is therefore a need for a device for making such installation and removal faster, simpler and more reliable than the prior art.

SUMMARY OF THE INVENTION

The invention is set forth and characterized in the main claim, while the dependent claims describe other characteristics of the invention.

It is thus provided a bracket assembly, comprising a first body and a second body, characterized in that the first body comprises one or more first retainers and the second body comprises one or more second retainers; said retainers being shaped and arranged for mating engagement by relative movement of one or both of the first and second body, whereby interaction between the retainers causes the first and second bodies to become interlocked and forced towards one another.

In one embodiment, the bracket assembly comprises a releasable lock for interlocking the first and second bodies when in a mated position. The releasable lock may comprise an abutment portion on the first body and a releasable friction member on the second body. The friction member may be spring-biased towards the abutment portion and may be released from the abutment portion by operation of a lever connected to the friction member.

In one embodiment, the first retainers comprise first and second lug pairs and the second retainers comprise first and second wedge portions. The wedge portions may be arranged at a shallow angle with respect to a vertical axis and the lugs may be arranged with a corresponding and complementary angle.

In one embodiment, the first body is configured as a support for a user-interface such as a keypad, display, telephone handset or handset cradle, or speakerphone, and is configured for assembly on the outside of a plate having an opening. The second body may be configured to hold an electronics device and be configured for assembly on the other side of said plate. The first retainers and the second retainers are configured for mutual interconnection through the opening. The surface areas (i.e. footprints) covered by the first and second bodies are individually greater than the area of the opening.

It is also provided a method of installing the invented bracket assembly, characterized by moving the first and second bodies in planes that initially are parallel or substantially parallel to one another, causing an interaction between the first and second retainers until the first and second bodies become interlocked and forced towards one another and clamped against an intermediate panel or plate.

The invented bracket assembly may be installed and removed without any need for screws, bolts or tools. The invention therefore provides an assembly which may be installed faster and more reliably, be less susceptible to vandalism, and having a lower manufacturing cost, than the prior art assemblies.

BRIEF DESCRIPTION OF THE DRAWINGS

These and other characteristics of the invention will become clear from the following description of an embodiment of the invention, given as a non-restrictive example, with is reference to the attached drawings, wherein.

DETAILED DESCRIPTION OF AN EMBODIMENT

Figure 1:
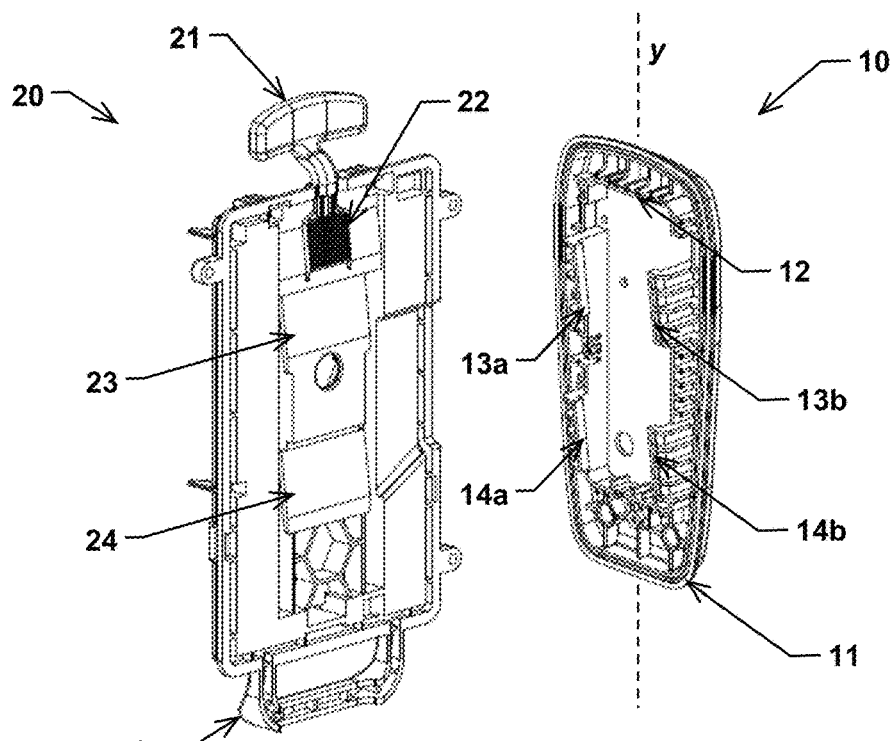
FIG. 1 is a perspective view of a first body and a second body of the invented bracket assembly.

The following description may use terms such as "horizontal", "vertical", "lateral", "back and forth", "up and down", "upper", "lower", "inner", "outer", "forward", "rear", "outside", "inside", etc. These terms generally refer to the views and orientations as shown in the drawings and that are associated with a normal use of the invention. The terms are used for the reader's convenience only and shall not be limiting.

Referring initially to FIG. 1, the invented bracket assembly comprises in its most basic form a first body 10 and a second body 20, in the following also referred to as a front and rear piece, respectively. The front piece 10 may typically be intended as a support for a user-interface (keypad, telephone handset, etc.) and is configured for assembly on the outside of a cabinet. The front piece 10 is formed as a housing and comprises a circumferential sealing member (e.g. a gasket) for sealing engagement with a cabinet wall. The rear piece 20 is typically intended as a holder for the front piece and a container for electronics components, and is configured for assembly on the inside of a cabinet.

The assembly interconnector comprises first retainers in the first body 10 and second retainers in the second body 20. In the illustrated embodiment, the first retainers comprise upper and lower lug pairs 13a,b, 14a,b, and the second retainers comprise upper and lower wedge portions 23, 24. The upper lugs 13a,b are arranged and shaped for mating engagement with the upper wedge portion 23. The lower lugs 14a,b are arranged and shaped for mating engagement with the lower wedge portion 24. The wedge portions are arranged at a shallow angle with respect to the vertical axis y, and the lugs are arranged with a corresponding and complementary angle.

The bracket assembly also comprises a lock, which comprises an abutment portion 12 on the first body 10 and a releasable lock, here in the form of a friction member 22 on the second body 20. In the illustrated embodiment, the friction member 22 is spring-biased towards the abutment portion 12 and may be released from the abutment portion by operation of a lever 21. It should be understood that other locks are conceivable within the scope of this invention.

Figure 2:
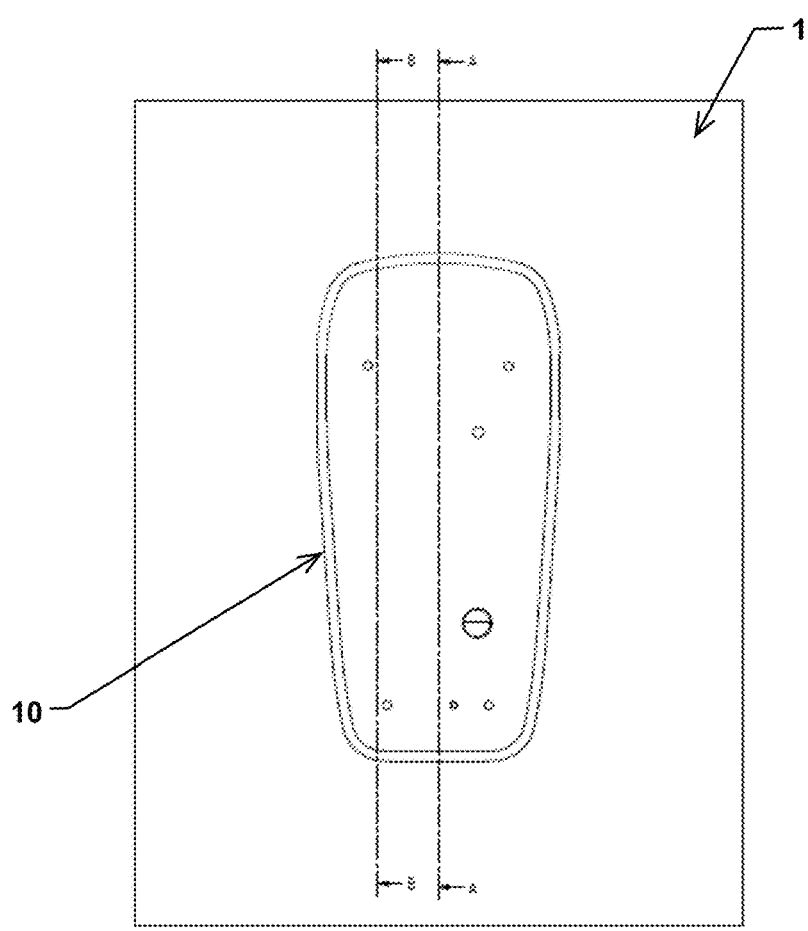
FIG. 2 is a schematic drawing of the bracket assembly mounted on a panel or wall, as viewed towards the first body.
Figure 3:
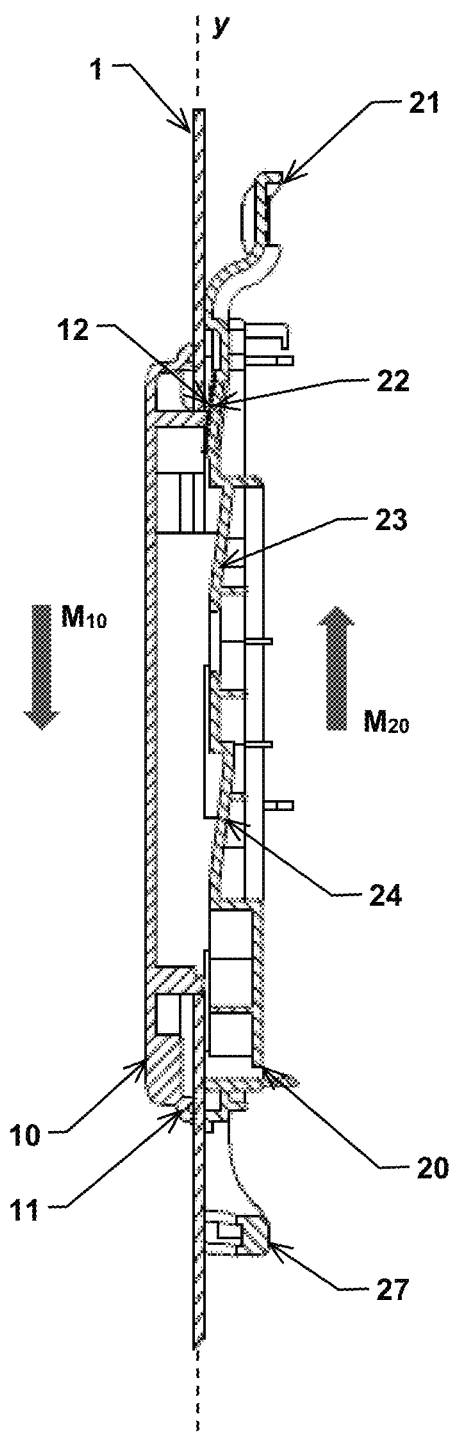
FIG. 3 is a section along section line A-A in FIG. 2, illustrating i.a. an interaction between an engagement portion on the first body and a friction member on the second body.
Figure 4:
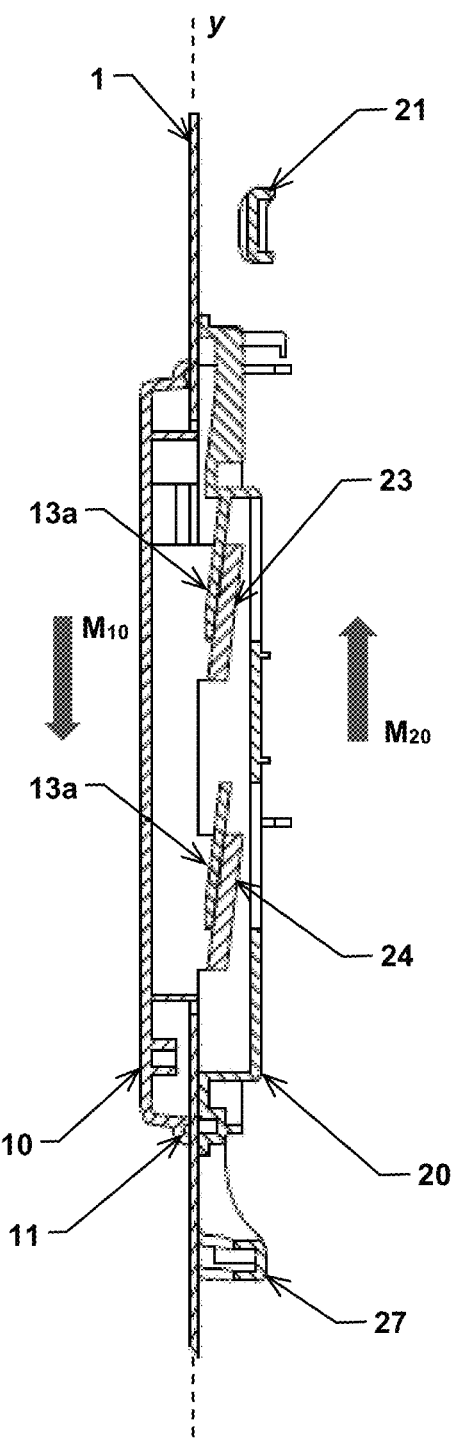
FIG. 4 is a section along section line B-B in FIG. 2, illustrating i.a. an interaction between first and second retainers.

Referring now additionally to FIGS. 2, 3 and 4, the first and second bodies 10, 20 are interconnected by bringing the pieces in close proximity of one another, and sliding the pieces with respect to one another, here along the vertical axis y. The general relative movements are indicated by respective arrows $M_{10}$ (for the first body) and $M_{20}$ (for the is second body). In general, it should be understood that one of the bodies may be stationary, while the other is moved. In the practical application as illustrated, the front piece 10 is placed against a plate or panel 1 having an opening 2 (see FIG. 5), and held in position in the opening. In the illustrated embodiment, the opening 2 is rectangular; this is not a requirement, but the size of the opening must be sufficiently large to accommodate the lugs and wedge portions, and not larger than the area covered by the first and second bodies (i.e. their footprints). The rear piece 20 is arranged against the other side of the plate 1; initially above level of the front piece 10. When the rear piece is moved downwards, for example pulled by the handle 27, the lug pairs 13a,b, 14a,b and corresponding wedge portions 23, 24 engage and thus interlock the front and rear pieces. It will be understood that the pieces are clamped with increasing force against the plate 1 as the interaction between the lugs and wedge portions increase. The front piece 10, which in the illustrated embodiment in configured to be on the outside of a cabinet and comprises a sealing gasket 11, is thus clamped firmly and sealingly against the plate 10 as the lugs and wedge portions engage. FIG. 4 shows how the lugs and wedge portions are firmly engaged.

In the illustrated embodiment, the lock contributes to maintaining the engaged and interlocked position described above. The engagement portion 12 is pressed against the friction member 22. The friction member 22 is arranged with a shallow angle with respect to the vertical axis y, to ensure adequate locking function with the engagement portion 12. When the assembly is to be disconnected, the lever 21 is operated to disengage the engagement portion 12 from the friction member 22, whereupon the front piece may be moved (upwards) to disengage the lugs from the wedge portions.

Figure 5:
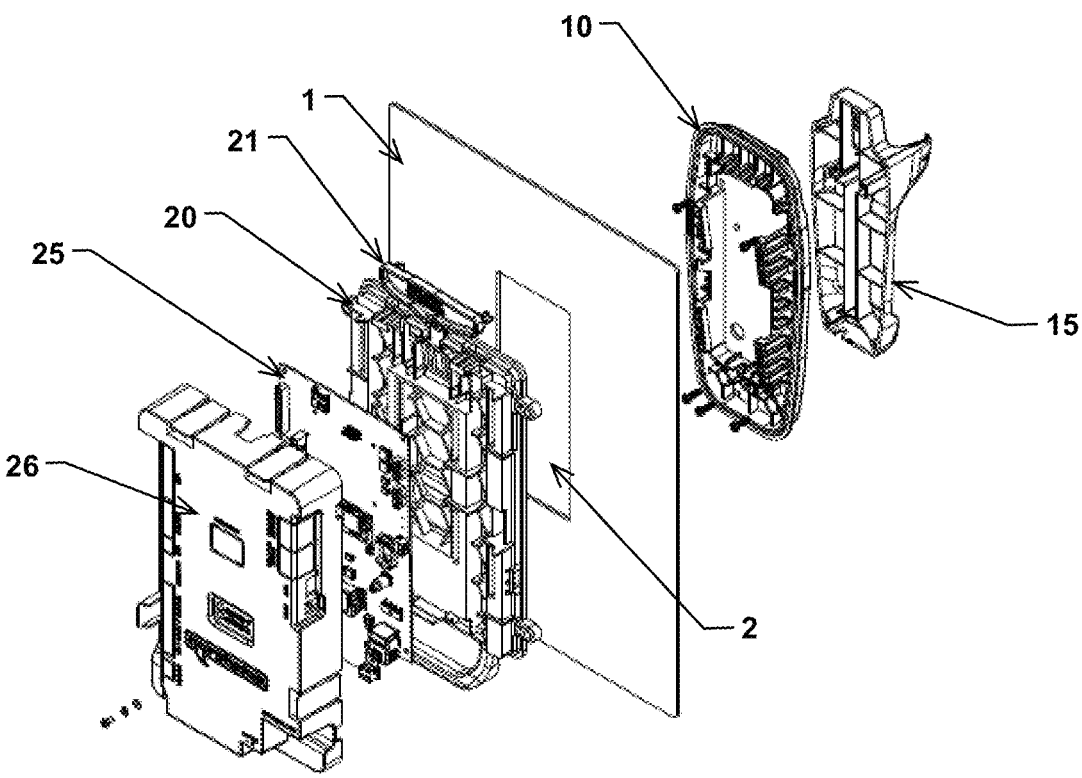
FIG. 5 is a perspective exploded view of the invented bracket assembly used as support for a telephone, illustrating i.a. a panel onto which it may be connected and various telephone components.
Figure 6:
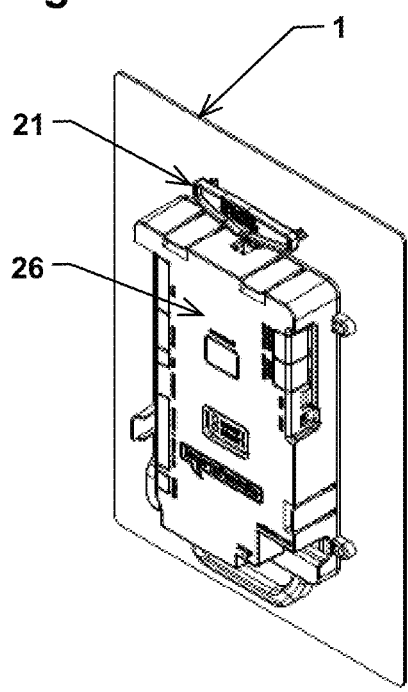
FIG. 6 is a perspective view of the assembly illustrated in FIG. 5, in an assembled state.
Figure 7:
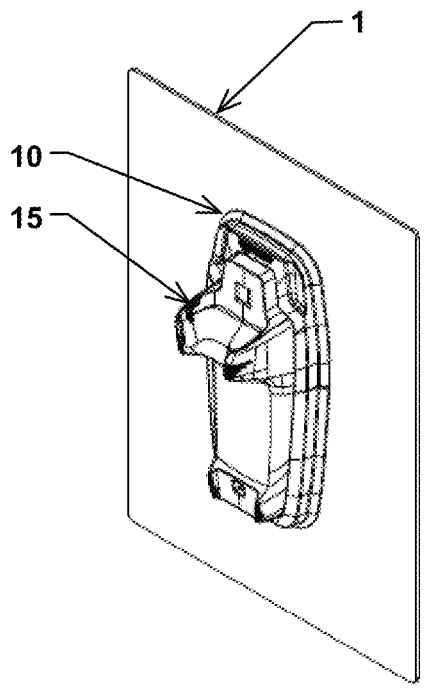
FIG. 7 is a perspective view of the assembly illustrated in FIG. 8, in an assembled state.
Figure 8:
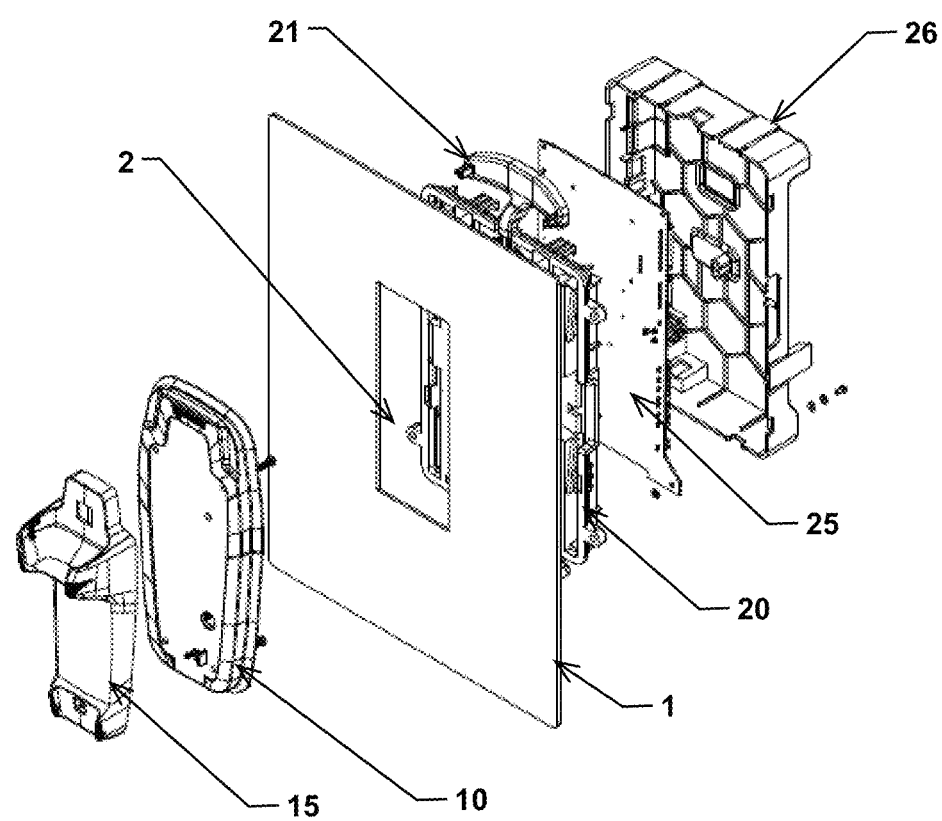
FIG. 8 corresponds to FIG. 5, but shows a different perspective.

FIGS. 5 and 8 are perspective exploded views of the invented bracket assembly used as support for a telephone, and FIGS. 6 and 7 are perspective views of the assembly in a connected state. Here, a telephone handset cradle 15 is configured for connection to the first body (front piece) 10. The cradle 15 may be connected to the front piece 10 by any known and suitable connector (e.g. screws of clips), or may be an integral part of the front piece is (not shown). A rear cover 26 is configured for connection to the second body (rear piece) 20. The cover 20, which may form a housing for an electronics component 25, may be connected to the rear piece 20 by any known and suitable connector (e.g. screws of clips).

The front and rear pieces may be made of any material suited for the intended use. Examples of suitable materials are polycarbonate, polyoxymethylene (POM), acrylonitrile butadiene styrene (ABS) and polyamide.

Although the interconnection and separation of the front and rear pieces have been described as moving one or more of the pieces along a vertical axis, the invention shall be equally applicable to configurations in which the interconnection and separation are accomplished by movement along other axes. Also, while the invention has been described with reference to two pairs of lugs engaging respective wedges, the invention shall not be limited to this number. A basic principle of the invention is that the front and rear pieces (first and second bodies) are moved in planes that initially are parallel or substantially parallel to one another, whereupon the interaction between first retainers (one or more lugs) 13a,b, 14a,b and second retainers (one or more wedges) 23, 24 causes the first and second bodies 10, 20 to become interlocked and forced towards one another until they are clamped against the intermediate panel or plate 1.

Although the bracket assembly has been described as a support device for an electronic device such as a telephone, the invention shall not necessarily be limited to such use.

What is claimed is:
1. A bracket assembly, comprising:
a first body, and
a second body,
wherein the first body comprises one or more lugs and the second body comprises one or more wedges,
wherein said lugs and wedges are shaped and arranged for mating engagement by relative movement of one or both of the first and second body,
wherein interaction between the lugs and wedges causes the first and second bodies to become interlocked and forced towards one another, and
wherein the lugs and wedges are configured to increase the force towards one another as the interaction increases.
2. The bracket assembly of claim 1, further comprising a releasable lock for interlocking the first and second bodies when in a mated position.

3. The bracket assembly of claim 2, wherein the releasable lock comprises an abutment portion on the first body and a releasable friction member on the second body.

4. The bracket assembly of claim 3, wherein the friction member is spring-biased towards the abutment portion and may be released from the abutment portion by operation of a lever connected to the friction member.

5. The bracket assembly of claim 1, wherein the lugs comprise first and second lug pairs, and the wedges comprise first and second wedge portions.

6. The bracket assembly of claim 5, wherein the wedge portions are arranged at an acute angle with respect to a vertical axis, and the lugs are arranged with a corresponding and complementary angle.

7. The bracket assembly of claim 1, wherein the first body is configured as a support for a user-interface.

8. The bracket assembly of claim 7, wherein the second body is configured to hold an electronic device.

9. The bracket assembly of claim 7, wherein the user-interface is one selected from the group consisting of a keypad, display, telephone handset or handset cradle, and speakerphone.

10. The bracket assembly of claim 1, wherein the lugs and the wedges are configured for mutual interconnection through an opening in a plate such that the first body and the second body sandwich the plate.

11. The bracket assembly of claim 10, wherein surface areas covered by the first and second bodies are individually greater than the area of the opening.

12. A method of installing the bracket assembly of claim 1, comprising moving the first and second bodies in planes that initially are parallel or substantially parallel to one another, causing an interaction between the lugs and wedges until the first and second bodies become interlocked and forced towards one another.

13. The method of claim 12, further comprising placing the first body against a plate or panel having an opening and holding the first body in position in the opening, and arranging the second body against the other side of the plate or panel, initially above a level of the first body, before the moving of the first and second bodies, whereby the first and second bodies are clamped against the panel or plate.

* * * * *